Oct. 13, 1925.  
W. DOST  
CHECKING IMPLEMENT  
Filed May 21, 1923
1,557,035
2 Sheets-Sheet 2
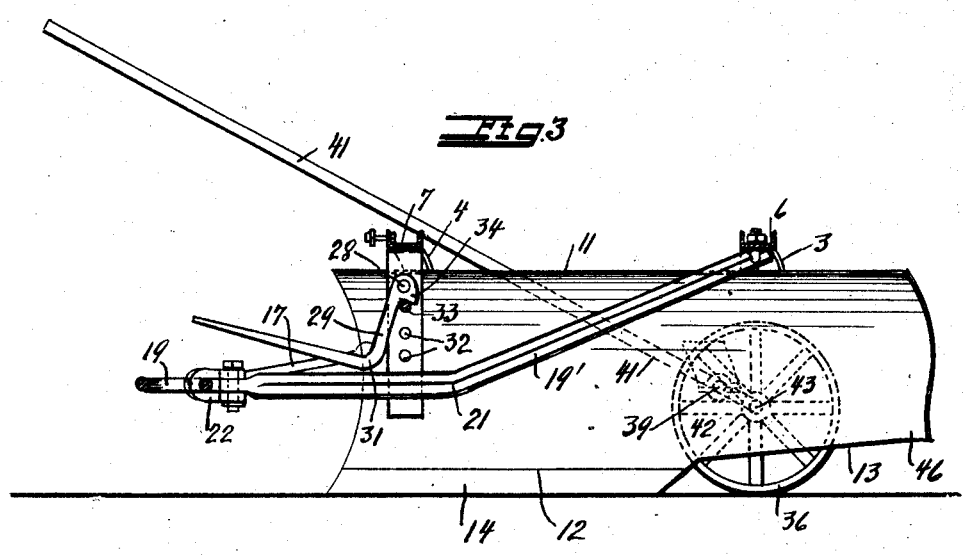
INVENTOR  
W. Dost  
By  
ATTORNEYS Patented Oct. 13, 1925.

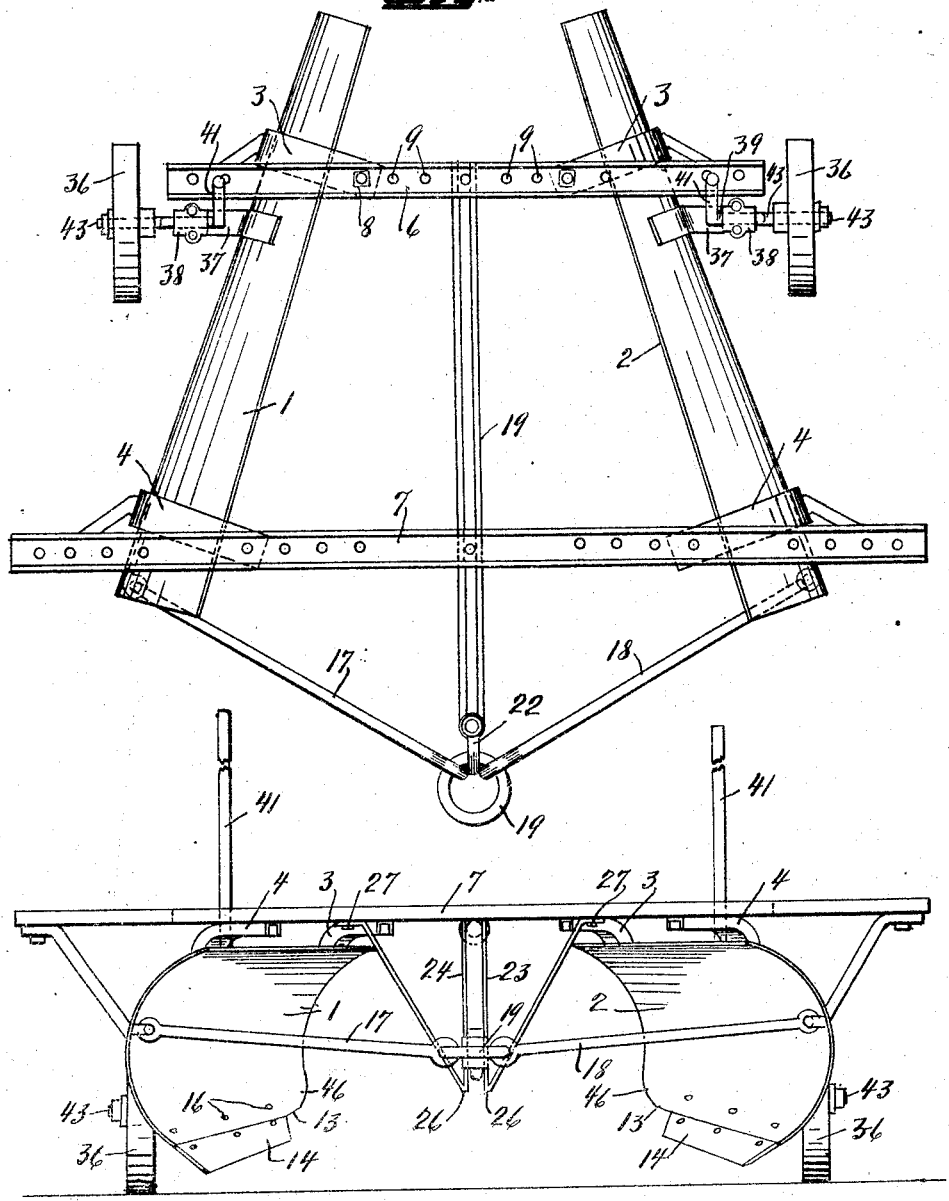

1,557,035

UNITED STATES PATENT OFFICE.

WALTER DOST, OF YUBA CITY, CALIFORNIA.

CHECKING IMPLEMENT.

Application filed May 21, 1923. Serial No. 640,586.

*To all whom it may concern:*

Be it known that I, WALTER DOST, a citizen of the United States and a resident of Yuba City, county of Sutter and State of California, have invented a new and useful Checking Implement, of which the following is a specification.

The present invention relates to improvements in checkers adapted to be used for the throwing up of checks or levees in preparing agricultural land for irrigation. The principal object of the invention is to provide a checking implement that will allow a check or levee to be thrown up in a single continuous operation, that requires comparatively little power and is capable of various adjustments. It is particularly proposed to provide an implement of the character described that may be attached to a tractor or other pulling agent in such manner that the pulling force is properly distributed so that it is unnecessary to apply weights or the like for maintaining the operative engagement of certain parts of the implement with the soil to be handled. It is further proposed to provide means whereby the distribution of forces may be readily controlled in accordance with the requirements of each case.

Further objects and advantages will appear as the specification proceeds.

The preferred form of the invention is illustrated in the accompanying drawings in which Figure 1 shows a plan view of my checking implement, Figure 2, a front view of the same, Figure 3, a side view, and Figure 4 a detail view of the rear end of one of the dirt moving plates of my device. While I have shown only the preferred form of the invention, it should be understood that various changes or modifications may be made within the scope of the claims hereto attached without departing from the spirit of the invention.

In my checker two plates (1) and (2), disposed in spaced relation to one another are curved to present their hollow faces inwardly. Each plate has two bands (3) and (4) secured to the outside and the bands are adapted to be secured to two cross bars (6) and (7) in such a manner that the two plates converge toward the rear. As means for securing the plates to the cross bars I preferably employ bolts (8) engaging corresponding perforations in the bands and the cross members, a plurality of perforations (9) being provided on the cross members to render the engagement adjustable.

The plates are formed to present in their front portions parallel top and bottom edges (11) and (12) while the rear ends of the bottom edges slant upwardly as shown at (13). Suitable blades (14) are removably secured to the lower edges of the plates by means of bolts (16). They extend only through the front portion of the plate while the rear portions, which are not intended to scrape and loosen dirt are not provided with blades.

The principal part of the present invention is the manner in which my implement is attached to a tractor or other pulling agent. Two rods (17) and (18) are pivoted to the inner faces of the two plates near their front ends and the free ends of the two rods engage a ring adapted to be secured to the draw bar of a tractor not shown in the drawing. A third rod or bar (19), preferably bent as shown at (21) is pivotally secured with one end to the rear cross bar (6) and with its other end to the ring (19) by means of a clevis (22). It should be noted that while the two rods (17) and (18) engage the plates near their respective centers the bar (19') engages the cross bar (6) above the plates so that when a forward pull is exerted on the ring (19) along a line passing through the center of gravity of the device this coupling has a tendency to exert downward pull on the rear end of the implement. This tendency would normally be slight but may be increased by forcing the front end of the bar (19') downward and in the latter case may be increased to such an extent that the front end of the checker is lifted off the ground.

To allow of such adjustment of the lower end of the bar (19') I provide a vertical guideway (23) comprising a U-shaped member (24) engaging the lower face of the front cross bar (7) with its back and having its legs turned as shown at (26) so as to slant upwardly and to return to the cross bar (7) to be secured by means of bolts (27). In the two legs (23) and (24) is supported a pin (28) on which pivots a lever (29) bent as shown at (31) so as to be adapted to be forced downwardly and to depress the bar (19'). A plurality of perforations (32) are provided in the legs of the U-shaped member (23) so as to allow the pin (28) to be lowered and raised. A second pin (33) engaging a shoulder (34) on the lever may be employed to hold the latter in place.

If desired my implement may be supported on wheels (36). For this purpose I provide brackets (37) extending outwardly from the two blades (1) and (2) and terminating in bearings (38) in which are journaled shafts (39), each having a lever arm (41) extending from one end and a short arm (42) extending from the other end in the opposite direction, which latter arm terminates in a transverse shaft (43) forming the axle for the wheel (36). By swinging the lever arm (41) on its pivot the wheels (36) may be forced downwardly to lift the rear end of the implement off the ground so that when pull is exerted at the front end the device will run on the wheels. If the lever arm is forced in the opposite direction the wheels are lifted and rendered inoperative.

The advantages of my device will appear from the foregoing description. To throw up a check the operator drags the implement over the field, preferably by means of a tractor. The blades scrape up the dirt and force the same inwardly and upwardly along the curved faces of the two plates. Only the front end of the implement engages all the dirt while the rear end engages only the upper portion of the same so as to form a ridge. Considerable power is saved due to this arrangement. It will be noted that while the general arrangement of the plates is such as to force the dirt inwardly the lower rear corners (46) of the plates flare outwardly so as to glide over the dirt easily. By means of my attachment the pulling forces may be distributed in such a manner that the rear end is acted on simultaneously with the front end and is forced downwardly during the checking operation by the direct pull which makes it unnecessary to place any weights on the same. Turning operations are also facilitated by my attachment since the front end of the bar (19') may be lowered to such an extent by means of the lever (29) that the front end of the implement is practically lifted off the ground so that the whole implement slides on the rear end without performing any work. The two plates may be set to any width desired in accordance with the size of dam which it is intended to produce. The particular form of each plate resembles the mold board of a plow and performs the same function allowing the dirt to be turned over gradually rather than to be pushed sideways.

I claim:

1. A checking implement of the character described, comprising two cooperating elements arranged to force dirt inwardly when dragged forward, a front and a rear bar bridging the same and holding them in spaced relation, and means for attaching the same to a pulling agent comprising a member engaging the pulling agent, two rods loosely connecting the same with the front ends of the two elements, a third rod connecting the same to the rear bar and adjustable means associated with the front bar bearing on the third rod for controlling the height of its front end.

2. A checking implement of the character described, comprising two cooperating elements arranged to force dirt inwardly when dragged forward, a front and a rear bar bridging the same and holding them in spaced relation, and means for attaching the same to a pulling agent comprising a member engaging the pulling agent, two rods loosely connecting the same with the front ends of the two elements, a third rod connecting the same to the rear bar guide means associated with the front bar straddling the third rod and a lever pivoted therein for controlling the height of its front end.

3. A checking implement of the character described, comprising two self-supporting cooperating elements arranged to force dirt inwardly when dragged forwardly and means for attaching the same to a pulling agent comprising means for connecting the front end to the pulling agent, means for independently connecting the rear end to the pulling agent and regulating means bearing on the latter means for distributing the traction between the two means.

WALTER DOST.